United States Patent [19]

Hatch

[11] 4,102,221

[45] Jul. 25, 1978

[54] CROSS-PLY COMPOSITE FLYWHEEL

[75] Inventor: Burton D. Hatch, Ballston Lake, N.Y.

[73] Assignee: General Electric Company, Schenectady, N.Y.

[21] Appl. No.: 706,896

[22] Filed: Jul. 19, 1976

[51] Int. Cl.² .............................................. F16F 15/30
[52] U.S. Cl. ........................................ 74/572; 428/65; 428/113
[58] Field of Search ................. 74/572, 573 R, 573 F, 74/574, DIG. 10; 428/64, 65, 113

[56] References Cited

U.S. PATENT DOCUMENTS

| 2,745,224 | 5/1956 | Erickson | 51/195 |
|---|---|---|---|
| 3,788,162 | 1/1974 | Rabenhorst et al. | 74/572 |
| 4,000,665 | 1/1977 | Rabenhorst | 74/572 |

FOREIGN PATENT DOCUMENTS

| 90,543 | 12/1922 | Austria | 428/65 |
|---|---|---|---|
| 552,016 | 6/1932 | Fed. Rep. of Germany | 428/65 |

OTHER PUBLICATIONS

J. B. Snell and J. N. Schurb, '"Scotch Ply" Prepregs for Flywheel Applications,' Nov. 12, 1975.

*Primary Examiner*—Stephen C. Bentley
*Attorney, Agent, or Firm*—Richard G. Jackson; Joseph T. Cohen; Leo I. MaLossi

[57] ABSTRACT

A flywheel comprises a plurality of overlying fiber layers embedded in a monolithic matrix of binder material. The fibers of each layer are parallel to each other and extend in radial and chordal directions. The fibers of each successive layer are oriented at a single predetermined angle to those of a preceding adjacent layer such that at least four layers of fibers are disposed between any two layers in which the fibers of both such layers extend substantially parallel to each other. By this structure, the flywheel of the present invention is made to exhibit a high strength-to-weight ratio, the centrifugal force generated by the flywheel, when spinning, being accommodated by the fibers along the axial direction of each fiber.

14 Claims, 6 Drawing Figures

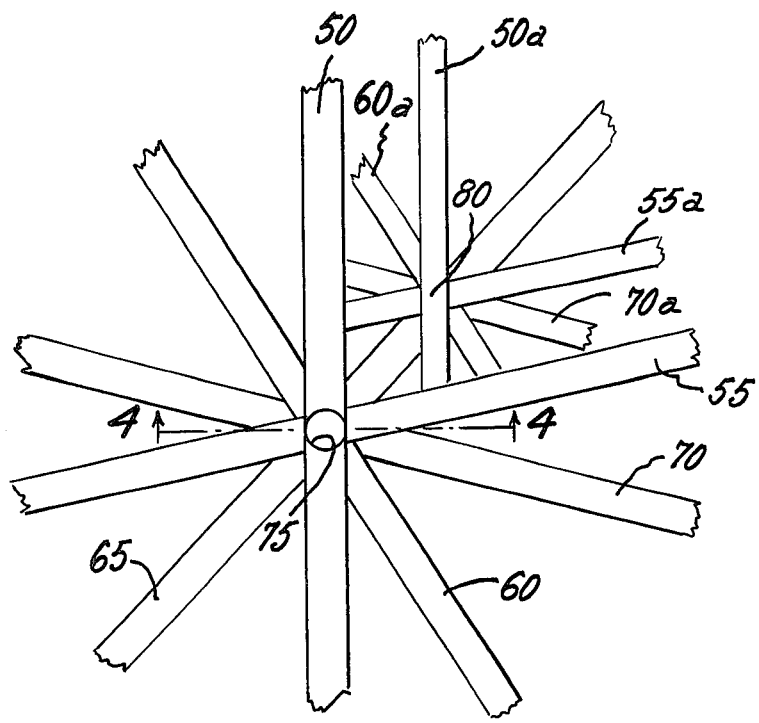
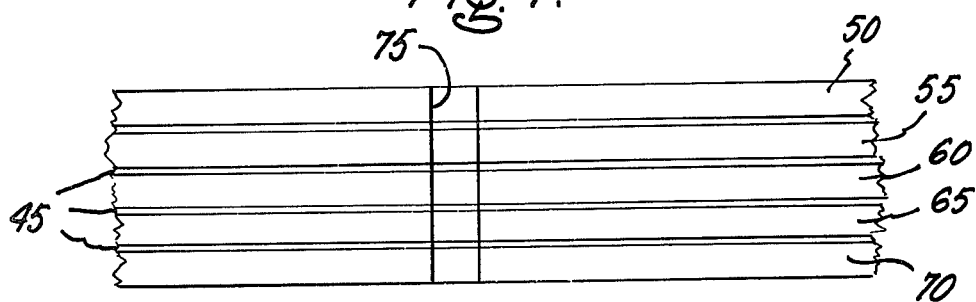
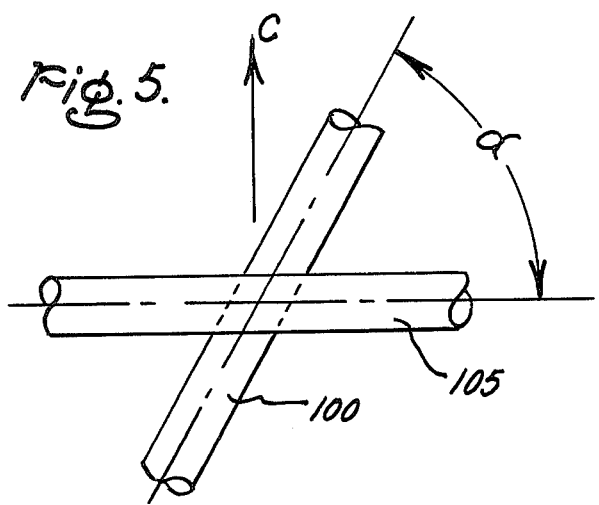
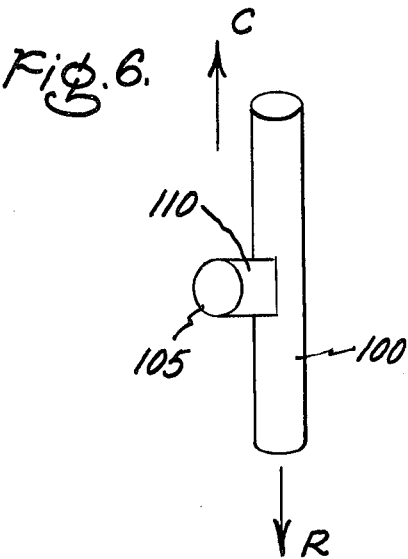

CROSS-PLY COMPOSITE FLYWHEEL

BACKGROUND OF THE INVENTION

1. Field of the Invention

This invention relates to flywheels adapted for the storage of energy and more particularly to such flywheels having a laminar composite construction.

2. Description of the Prior Art

Recently, there has been a revival in the engineering and scientific interest in flywheels. This owes to the fact that flywheels provide an efficient means of energy storage with no adverse environmental impact. Flywheels may be useful as means for energy storage in solar energy systems, mechanical power systems, and electrical power systems. For example, electrical utilities may employ flywheels as a means of storing energy required for times of peak loading. Flywheels may also be useful as means for storing energy for propulsion and auxiliary power in air, land, sea and space vehicles.

Flywheels function by storing kinetic energy. The amount of energy capable of being stored in a particular flywheel is a function of the mass of the flywheel, the distribution of mass within the flywheel, and the maximum allowable speed of rotation of the flywheel. However, the maximum allowable speed of rotation of a flywheel is limited by the strength of the material from which the flywheel is formed. That is, as the rotational speed of a flywheel increases, the internal stresses within the flywheel also increase, which stresses, if allowed to exceed certain limits, would cause the flywheel to break apart or fracture. Therefore, optimally, flywheels should be constructed from materials having high strength to weight ratios.

Prior art flywheels, for the most part, have proven unsatisfactory in meeting energy storage requirements within certain constraints of mass and volume. For example, many prior art flywheels comprise discs or solid cylindrical members formed from a homogeneous metal and rotatable about the central axes thereof. Although these homogeneous metal flywheels are formed from high strength materials, the strength-to-weight ratios available in metal and the fracture mechanics of metal under cyclic fatigue conditions severely limit the flywheels' energy storage capabilities. Therefore, these prior art metal flywheels tend to be quite heavy. Moreover, should such prior art metal flywheel rupture, pieces breaking off the ruptured flywheel would possess sufficient energy to seriously damage equipment or injure persons in the vicinity. Such prior art metal flywheels are primarily useful where there are no size or weight constraints and where precautions have been taken to ensure the safety of persons or machinery in the area of the flywheel.

To overcome these disadvantages associated with prior art metallic flywheels, composite flywheels were developed. These composite flywheels are normally fabricated from a multiplicity of fibers of glass or similar materials disposed in a matrix or binder of epoxy resin or other suitable material.

Since such prior art composite flywheels are of a relatively low density as compared to prior art metallic flywheels, composite flywheels must be rotated at a higher velocity (i.e. tens of thousands of revolutions per minute) than a metallic flywheel of equal dimension to store an equivalent amount of kinetic energy. These prior art composite flywheels have for the most part been formed by a circumferential distribution of the fibers within the binder or matrix. Since, when a body rotates it is subject to stresses due to centrifugal force in a radially outward direction, such prior art composite flywheels must carry this centrifugal stress in directions normal to the axes of the fibers from which it is formed, placing the resin matrix in tension. Usually, epoxy and other resins employed with composite flywheels are relatively weak when loaded in tension as compared to the strengths of the fibers. Therefore, applying a high rotational speed to such a composite flywheel can cause the flywheel to break apart along circumferential lines between the fibers from which it is formed.

Prior art composite materials have also been formed from unified laminar constructions, each lamination comprising a multiplicity of parallel fibers embedded in a matrix of binder material and overlying an adjacent lamination such that the fibers of adjacent laminations are oriented at angles of either 60° or 90° with respect to each other. However, a flywheel formed from such prior art materials of these laminar constructions and particular angular orientations exhibits significant variations in load carrying abilities throughout its mass. For example, in a flywheel having a 60° orientation between fibers of adjacent layers, if a first point is capable of carrying a particular value of centrifugal loading at a given radial strain (i.e. displacement), a second point at the same radius but displaced by 30° from the first point will be able to accommodate only 87% of that loading at the same radial strain. Such a variation in strength and stiffness throughout a flywheel has the effect of introducing shear stresses and severely limiting the load carrying ability of the flywheel and therefore limits the energy storage capabilities of the flywheel.

Therefore, it is an object of the present invention to provide a cross-ply composite flywheel free of the deficiencies of prior art and capable of storing requisite amounts of energy within constraints of limited weight and volume.

It is another object of the present invention to provide a cross-ply composite flywheel wherein the risk of delamination or fracture at high rotational speeds is minimized.

SUMMARY OF THE INVENTION

These and other objects apparent from the following detailed description taken in connection with the appended claims and accompanying drawings are attained by providing a flywheel with a plurality of overlying fiber layers embedded in a monolithic matrix of binder material. The fibers of each layer are parallel to each other and extend in radial and chordal directions. The fibers of each successive layer are oriented at a single predetermined angle to those of a preceding adjacent layer such that at least four layers of fibers are disposed between any two layers in which the fibers of both such layers extend substantially parallel to each other. By this structure, the flywheel of the present invention is made to exhibit a high strength-to-weight ratio, the centrifugal force generated by the flywheel when spinning being accommodated by the fibers along the axial direction of each fiber.

BRIEF DESCRIPTION OF THE DRAWINGS

FIG. 3 is an enlarged portion of a flywheel employing the cross-ply construction of the present invention with a majority of the fibers removed and the remaining fibers magnified to show details of construction.

FIG. 4 is a view taken along line 4—4 of FIG. 3.

FIG. 5 is an enlarged view of portions of two fibers and the binder therebetween employed in the cross-ply composite flywheel of the present invention illustrating the means by which forces are transmitted between fibers.

FIG. 6 is a side view of the fibers and binder shown in FIG. 5.

DESCRIPTION OF THE PREFERRED EMBODIMENT

Figure 1:
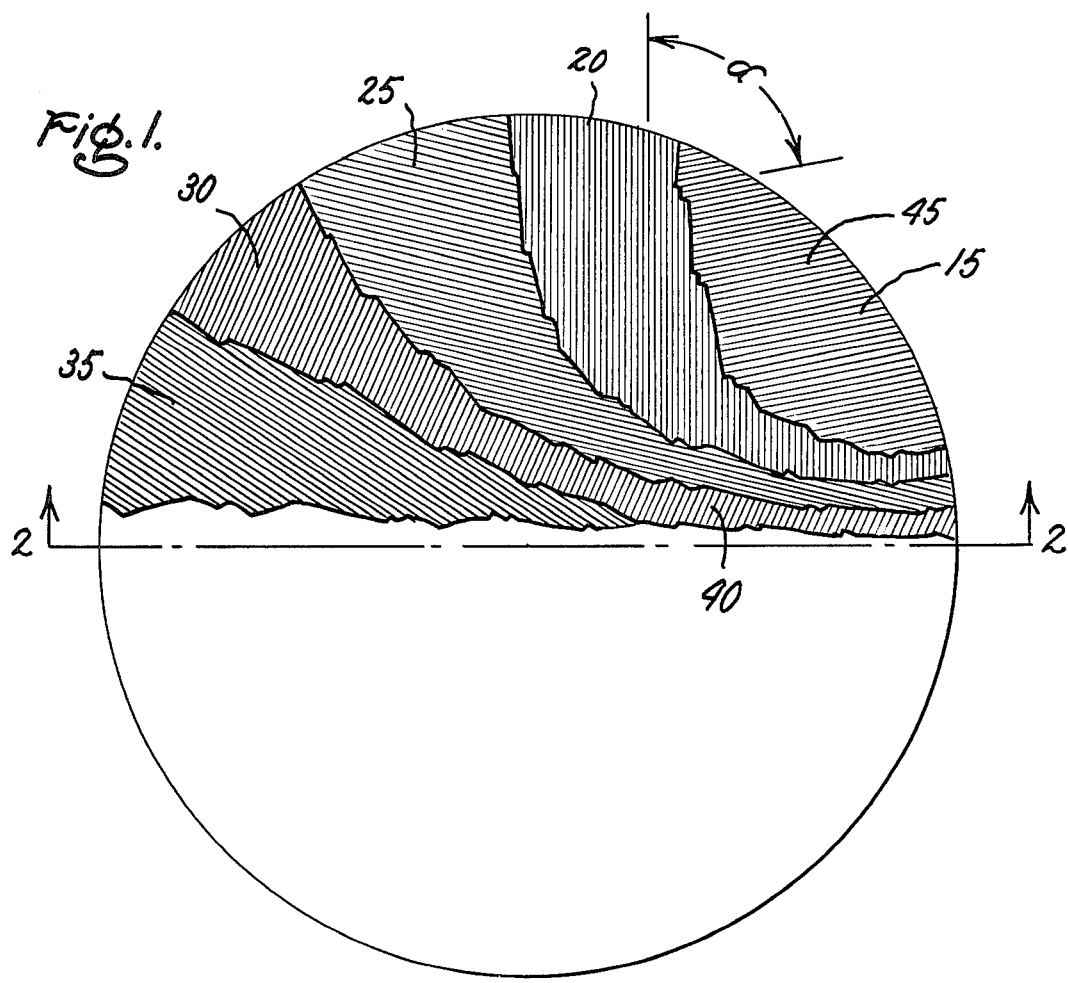
FIG. 1 is a plan view of a flywheel employing the cross-ply composite construction of the present invention with portions of the laminations broken away to show details of construction.
Figure 2:
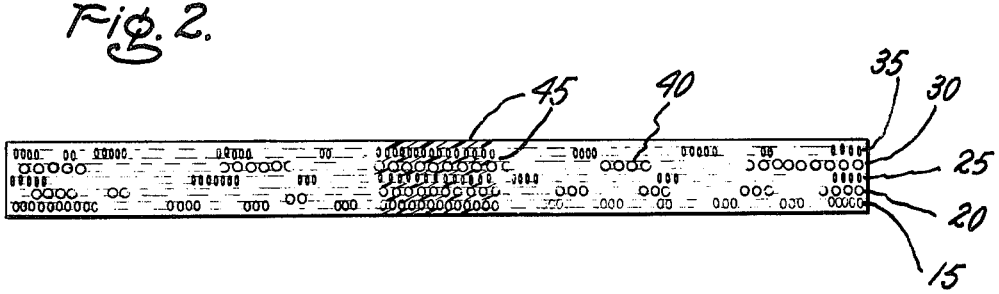
FIG. 2 is a sectional view taken along line 2—2 of FIG. 1.

These deficiencies in prior art composite flywheels set forth hereinabove are overcome by the cross-ply composite flywheel of the present invention as shown in FIGS. 1 and 2. Referring to FIGS. 1 and 2, a flywheel 10 is formed from a plurality of layers 15, 20, 25, 30 and 35 of equally spaced parallel fibers overlying each other. Although only five such layers are shown, it will be understood that any number of such overlying layers may be employed to achieve the requisite strength and mass of the flywheel. As shown in FIG. 2, each of the layers is formed from a multiplicity of radially and chordally extending glass fibers 40 disposed in a monolithic matrix 45 of epoxy resin. Fibers of metallic material, ceramics, or organic materials may also be employed as may binders of metals, elastometers, ceramics or plastics.

In fabrication of the flywheel of the present invention each layer may, for example, be cut from commercially available glass fiber sheeting pre-impregnated with a partially cured epoxy binder and approximately 0.010 inches thick. A suitable sheeting is available through Minnesota Mining and Manufacturing Company and sold under the trademark Scotch Ply. The binder is cured by an application of heat and pressure to a lay-up of requisite thickness and upon curing is formed into a monolithic structure, the fibers being embedded in the binder in layer form.

It should be noted that due to the low cost of such pre-impregnated fiber sheets, the cross-ply composite flywheel of the present invention may be manufactured with substantial economy. Moreover, because of its solid cylindrical shape, the cross-ply composite flywheel of the present invention exhibits very low levels of resonance and vibration and is therefore easily balanced and dynamically stable. However, the cross-ply composite structure of the present invention may be employed in flywheels of other shapes and still yield superior capabilities of energy storage.

Again referring to FIG. 1, it can be seen that the fiber layers 15, 20, 25, 30 and 35 are disposed in an overlying relationship during assembly such that the parallel radial chordal fibers of one layer are oriented at a specific angle with respect to the parallel fibers of the preceding adjacent layer, the angle between the fibers of any two such adjacent layers remaining constant throughout the thickness of the flywheel. The fibers of any two adjacent layers as shown in FIG. 3 are oriented at an angle alpha($\alpha$) apart. In two such tested embodiments, alpha was equal to 72° and 77.13° respectively.

However, it must be appreciated that angle alpha may be varied in accordance with many factors including the thickness of laminations, the fabrication processes, and the materials from which the fibers and the matrix are formed to achieve an optimum strength for a given flywheel. In accordance with the present invention angle $\alpha$ is chosen so that at least four layers of fibers are interposed between any two layers, the fibers of which extend in the same angular direction. By this construction, the deficiencies of prior art laminated flywheels (those employing a 60° or 90° orientation between fibers of adjacent layers) are overcome, since each of these angles if avoided as angle alpha. As hereinbefore set forth such prior art flywheels vary in strength and stiffness at various locations around a common radius of the flywheel. The provision of four or more fiber layers between layers having fibers oriented in a common direction effectively minimizes these angular variations in strength and stiffness, imparting to the flywheel of the present invention a uniformity of strength and stiffness normally associated only with flywheels of homogeneous composition.

FIG. 3 shows, in detail, the construction by which the cross-ply composite flywheel of the present invention achieves another aspect of superior performance. In FIG. 3 is shown a portion of the cross-ply composite flywheel of the present invention with most of the glass fibers removed and the remaining fibers magnified. The portion of the flywheel illustrated in FIG. 3 comprises five layers, the radially oriented fibers from each of the five layers being designated as 50, 55, 60, 65 and 70. The angle alpha of orientation between the fibers of adjacent layers is, in this embodiment, approximately 72°.

An aperture 75 is provided at the center of the flywheel for mounting the flywheel on a suitable shaft. It will be appreciated that mounting holes whether disposed at a single location as shown in FIG. 3 or at a plurality of non-axial locations cut certain of the fibers and introduce regions of stress concentrations in fibers neighboring the aperture. These regions of cut fibers (i.e. cut by the hole(s)) have the effect of placing additional loading on these neighboring fibers, a situation which, if compensation is not made therefor, effectively weakens the flywheel and adversely effects the flywheel's ability to store the requisite amounts of energy. As explained hereinbelow, by the construction of the present invention, this additional loading is transferred to uncut fibers in adjacent layers thereby minimizing the adverse effects of such mounting holes.

Still referring to FIG. 3, chordal fibers in the upper three and lower single layers are designated as 50a, 55a, 60a and 70a. As set forth hereinabove, mounting hole 75, by cutting the radial fibers in each of the five layers additionally loads neighboring (i.e. chordal) fibers in the central portion of the flywheel and introduces added stress therein. However, the cross-ply structure of the flywheel of the present invention effects the transfer of these additional loadings (via the matrix at radially outward points) axially to uncut fibers in adjacent layers and thereby distributes these stresses throughout the flywheel, minimizing the adverse effects of these stress concentrations. As shown in FIG. 3, chordally extending fibers 50a, 55a, 60a and 70a cross each other and cross over centrally cut radially extending fiber 65 at 80. Where these chordally extending fibers cross radially extending fiber 65, the centrifugal force acting upon fiber 65 is transferred axially to the chordally extending fibers in adjacent layers which cumulatively accommodate the extra loading from these cut fibers. Likewise, if an individual fiber in layer 65 were disposed immediately adjacent to hole 75, the additional loading within that fiber resulting from the inability of the immediately adjacent cut radial fiber to carry any load would be almost entirely shared by and transferred to chordal fibers 50a, 55a, 60a and 70a in a similar manner. Therefore, the adverse effects of stress concentrations introduced within a flywheel from mounting holes therein being minimized, the resulting strength of the flywheel is increased allowing the flywheel to rotate at extremely high rates of speed to store requisite amounts of energy.

Of course, the benefits of the cross-ply composite structure of the flywheel of the present invention are not limited to the minimization of failure risks due to stress concentrations introduced by mounting holes. Since the fibers within the matrix extend in radial and chordal directions rather than circumerentially, the matrix or epoxy resin binder between adjacent fibers is not loaded in tension but rather, is loaded in shear. Because the fiber layers are very thin and individually of a relatively low mass, the resin binders are required to carry only the small centrifugal forces associated with each of the very thin layers in which the binders are located. These individual forces load the binders in shear, and are of small magnitude when compared with the shear strength of the binder. Therefore, a larger selection of binder materials are suitable for use in the flywheel of the present invention and the risk of delamination at locations of the binder (between fibers) is minimized, increasing the capability of the flywheel to rotate at extremely high speeds and store requisite amounts of energy.

FIGS. 5 and 6 illustrate the means by which forces are transmitted between adjacent fibers. Shown in FIGS. 5 and 6 are adjacent fibers 100, 105 from two different layers and an intermediate body of binder 110. Assuming that fibers 100 and 105 are components of adjacent layers of a flywheel acted upon by centrifugal force represented by arrow C at this location, it can be seen that the centrifugal force acts in a direction approximately perpendicular to the axis of fiber 105. As previously set forth, fibers such as those shown at 100 and 105 are strongest in directions parallel to the axes of the fibers. By the construction of the present invention, the centrifugal force acting on the mass of fiber 105 is transmitted through a shear force acting through binder 110 to fiber 100 which can due to its near perpendicular orientation with respect to fiber 105 accommodate a major portion of the centrifugal force C by a resultant axial force R.

The ability of epoxies and similar materials employed as binders to effectively withstand such shear loading enhances the strength of the cross-ply composite flywheel of the present invention. Furthermore, it will be appreciated that unlike certain prior art composite flywheels wherein the fibers are loaded in directions perpendicular to their axis, the fibers in the flywheel of the present invention are loaded in axial directions, the directions in which they are strongest. This further increases the ability of the flywheel to store large amounts of energy. It should also be noted that the ability of the fibers to accept centrifugal loading from strands of adjacent layers serves to minimize the adverse effects of other sources of stress concentrations due to the introduction mounting holes or the like.

Although the cross-ply composite flywheel of the present invention has been illustrated in a simple cylindrical form, the cross-ply composite structure may be employed in flywheels of varying shapes. The flexibility of the laminations before they are layed up allows the construction of the present invention to be practiced in a number of overall shapes and therefore, the present invention is not limited in its application to a flat flywheel of a right cylindrical shape.

It can be seen then that the cross-ply composite flywheel of the present invention is both strong and light in weight and approximately isotropic circumferentially and radially thereby combining many of the advantages of both metallic and composite prior art flywheels. The high strength of the cross-ply composite flywheel of the present invention enables this flywheel to be rotated at extremely high rates of speed to store substantial amounts of energy with a minimum risk of delamination.

While there has been shown a specific embodiment of the cross-ply composite flywheel of the present invention, it will be understood that other embodiments may exist within the true spirit and scope of this invention and it is intended be the appended claims to cover all such modifications.

What is claimed is:

1. A flywheel comprising a plurality of fiber layers, the fibers of each layer being parallel to each other and extending in radial and chordal directions, said layers being embedded in a monolithic matrix of binder material, the fibers of each successive layer being oriented at a single predetermined angle to those of the preceding adjacent layer such that at least four layers of fibers are disposed between any two layers in which the fibers of said two layers extend substantially parallel to each other, said predetermined angle having a value between approximately 70° and approximately 110°.

2. The flywheel of claim 1 wherein said layers are planar.

3. The flywheel of claim 1 wherein said fibers are metallic.

4. The flywheel of claim 1 wherein said fibers are of glass.

5. The flywheel of claim 1 wherein said fibers are of ceramic.

6. The flywheel of claim 1 wherein said fibers are of an organic material.

7. The flywheel of claim 1 wherein said binder is an epoxy resin.

8. The flywheel of claim 1 wherein said binder is metallic.

9. The flywheel of claim 1 wherein said binder is an elastomer.

10. The flywheel of claim 1 wherein said binder is a ceramic.

11. The flywheel of claim 1 wherein said binder is a plastic.

12. The flywheel of claim 1 wherein said angle is approximately 77.13°.

13. The flywheel of claim 1 wherein each of said layers is approximately 0.010 inch in thickness.

14. The flywheel of claim 1 of generally solid cylindrical shape and having a mounting hole extending axially through the center of the plurality of layers for mounting the flywheel on a shaft.

* * * * *